US006630682B2

(12) United States Patent
Shanley et al.

(10) Patent No.: US 6,630,682 B2

(45) Date of Patent: Oct. 7, 2003

(54) COMBINATION UV INSPECTION LIGHT AND FLASHLIGHT

(76) Inventors: Victor J. Shanley, 22401 Madison, St. Clair Shores, MI (US) 48081; Kenneth J. Kranz, 868 Bennaville, Birmingham, MI (US) 48009

( * ) Notice: Subject to any disclaimer, the term of this patent is extended or adjusted under 35 U.S.C. 154(b) by 176 days.

(21) Appl. No.: 09/805,367

(22) Filed: Mar. 13, 2001

(65) Prior Publication Data

US 2003/0085366 A1 May 8, 2003

Related U.S. Application Data

(60) Provisional application No. 60/188,958, filed on Mar. 13, 2000.

(51) Int. Cl.[7] .................................................. G01J 1/00

(52) U.S. Cl. .............................. 250/504 R; 250/504 H; 362/293

(58) Field of Search ........................ 250/504 R, 492.22, 250/504 H, 461.1; 362/293

(56) References Cited

U.S. PATENT DOCUMENTS

| | | | | | |
|---|---|---|---|---|---|
| 5,149,972 | A | * | 9/1992 | Fay et al. | 250/461.1 |
| 5,905,268 | A | * | 5/1999 | Garcia et al. | 250/504 R |
| 5,929,954 | A | * | 7/1999 | Omae et al. | 250/461.1 |
| 6,177,678 | B1 | * | 1/2001 | Brass et al. | 250/504 R |
| 6,355,935 | B1 | * | 3/2002 | Kalley et al. | 250/504 R |

FOREIGN PATENT DOCUMENTS

FR 0723107 A1 * 7/1996

* cited by examiner

*Primary Examiner*—John R. Lee
*Assistant Examiner*—Paul Gurzo
(74) *Attorney, Agent, or Firm*—John R. Benefiel

(57) ABSTRACT

A UV light utilizing an angled dichroic cold mirror reflector to selectively direct UV light out of a window on the side of the light housing while transmitting visible and infrared light out a window in the end of the housing to eliminate heat. The light may be used both as a flashlight and a black light for UV inspection. A removable cap can be placed over the end window to block visible light.

8 Claims, 3 Drawing Sheets

COMBINATION UV INSPECTION LIGHT AND FLASHLIGHT

CROSS REFERENCE TO RELATED APPLICATIONS

This patent application claims benefit of U.S. provisional Serial No. 60/188,958, filed Mar. 13, 2000.

BACKGROUND OF THE INVENTION

This invention concerns ultraviolet (UV or black) lights of a type used by technicians in carrying out leak detection inspections by illuminating potential leak sites to detect the presence fluorescent tracer dyes. This is commonly done in servicing air conditioning refrigeration systems, automobile air conditioning systems components, hydraulic machinery, etc.

The dyes are typically mixed with a compatible oil and injected into the system. If leaks are present, a trace of the dye and oil mixture flow onto external surfaces. This leakage fluoresces when illuminated with UV and sometimes blue light, emitting visible light which can be seen by the technician.

Such UV lights particularly adapted for leak detection service applications have been developed in recent years, utilizing selective reflection filters, sometimes referred to as "dichroic" filters which transmit ultraviolet wavelengths and reflect back visible light to maximize the user's ability to see any fluorescence that occurs. Such lights require high wattage lamps as a UV source as compared with most other application of UV lights, which therefore emit considerable heat energy. The use of reflecting or "dichroic" filters is a significant improvement over absorbent filters used in the past selectively which absorbed visible light from the high intensity light emitted by the lamps, since the filters themselves overheated if the light was used for long periods and sometimes cracked during such use.

For this reason, the dichroic filters have been designed to transmit infrared radiation as well as UV to prevent overheating of the dichroic filter and other components. This is described in copending U.S. application Ser. No. 08/964,839, filed on Nov. 5, 1997 and U.S. Pat. No. 5,905,268. In those lights, visible light is reflected back into the housing such that some heating of the interior of the light occurs.

In another types of testing, dyed smoke is used to initially locate leak, requiring a flashlight to detect the smoke. Also, it is often useful to have a flashlight available in darkened locations in buildings where equipment is being serviced. The previously UV lights have not been able to be used as an ordinary flashlight.

Accordingly, it is the object of the present invention to provide a UV light which while utilizing a high intensity lamp as a powerful source of UV light does not result in overheating of the light nor specifically the optical components eliminating visible light, and which emits a very high proportion of the UV light generated by the lamp.

It is another object to provide such a UV light which is also conveniently useable as a flashlight.

SUMMARY OF THE INVENTION

The above objects as well as others which will become apparent upon a reading of the following specification and claims are achieved by using a reflector rather than a dichroic filter to selectively act to produce a beam of UV light while also directing the visible and IR radiation out from the light.

The reflector selectively reflects only emitted UV light by the lamp, while transmitting visible and IR radiation. Such dichroic reflector is commonly known in the art as a "cold mirror". The cold mirror reflector is angled with respect to the high wattage lamp so that the UV light beam is directed out of a light housing through a first window formed on one side of the light.

On the other hand, visible and infrared light is transmitted through the cold mirror reflector and out from a second window in the front end of the light housing.

A detachable cap may be secured over the second housing wind to optionally block the visible-infrared light beam from exiting the light housing.

Heating of the cold mirror reflector is minimized as none of the wavelengths are absorbed by that optical element, nor is retained elsewhere within the light housing when the cap is removed.

At the same time, the light is capable of a dual use, i.e., as a pure UV light source and also as a flashlight increasing its utility to the user, particularly where tracer smoke testing is to be practiced.

The light according to the invention is also compact and may be manufactured at low cost.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
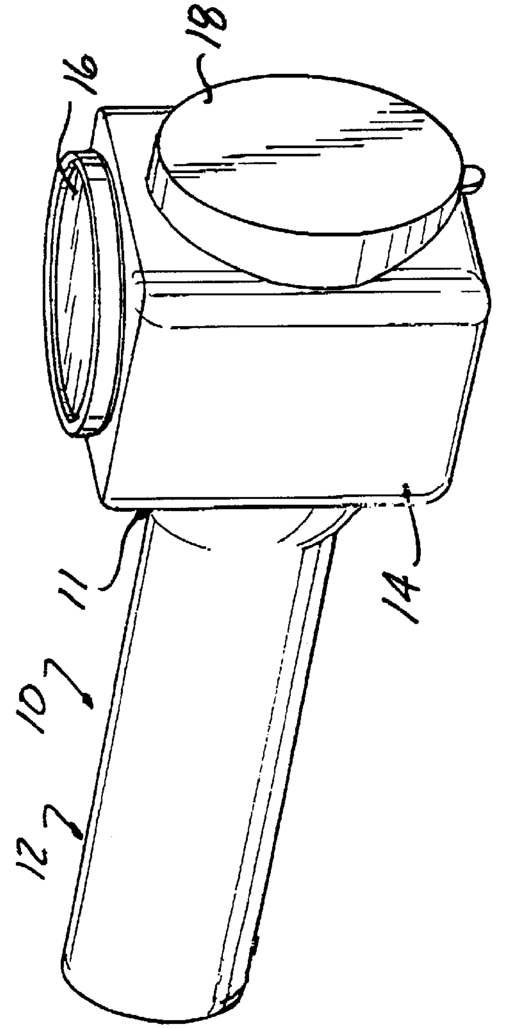
FIG. 1 is a perspective exterior view of an embodiment of a light according to the invention.

Referring to the drawings, and in particular FIG. 1, the UV light 10 according to the present invention includes a housing 11 comprised of an elongated handle 12 and head portion 14 both made of a suitable molded plastic.

A UV light beam window 16 faces to one side of the light 10, while a visible-infrared window facing the end of light 10 is shown covered with a plastic cap 18.

Figure 2:
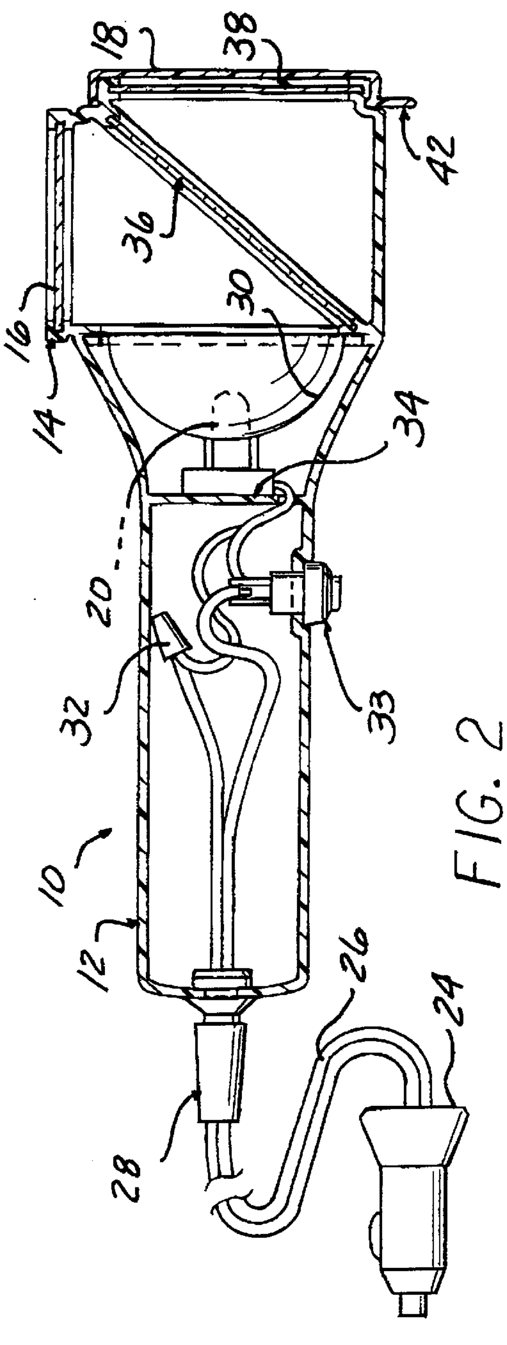
FIG. 2 is a partially sectional view taken through the light shown in FIG. 1.

FIG. 2 shows the inner details of the UV light 10. A 12 volt 100 watt lamp 20 which is a powerful source of UV and visible radiation of a much greater power than the type used with a standard flashlight. The lamp 20 may be of the Xenon type of high color temperature (3500K) which produces substantial long wave ultraviolet emissions. The envelop is made of quartz which is itself highly transmittive to long wavelength ultraviolet, i.e., 340–380 nm. Such a lamp is available from Osram Sylvania under part number FCR 64625 HLX.

The lamp 20 is located at the approximate focal point of a parabolic reflector 30, electroformed of nickel on an accurately shaped stainless steel mandrel. A focal length of 0.187 inches allows the lamp 20 to be approximately located at the focal point to maximize beam concentration.

As described in copending U.S. application Ser. No. 09/491,413, filed on Jan. 26, 2000 and U.S. application Ser. No. 08/964,839, filed on Nov. 5, 1997, the parabolic reflector 30 is preferably coated to eliminate destructive interference which would reduce the intensity of the reflected UV light The surface of the parabolic reflector 30 has a plurality of coatings applied thereto, one of aluminum and one of silicon dioxide. The interface of silicon dioxide and air, and silicon dioxide and aluminum produces a double refraction in an opposite sense, which offset each other to eliminate the potential destructive interference which otherwise could occur.

The first coating is of aluminum, while the second coating is of silicon dioxide. The thickness of the silicon dioxide should be uniform and accurately held to achieve this effect, the thicknesses determined by the "quarter wave stack" principle.

The refractive index of each interface, i.e., the silicon dioxide and air, silicon dioxide and aluminum determines the effective phase shift of the reflected light. A thickness of aluminum of 0.057 microns and of silicon dioxide of 0.066 microns has been successfully used for this purpose. The silicon dioxide-air interface causes an approximate 13 degree forward phase shift, the silicon dioxide-aluminum interface a 13 degree lagging phase shift, thereby offsetting each other.

Silicon dioxide coatings have heretofore been employed simply to protect the substrate from scratches and oxidation but have not been sufficiently uniform nor of the proper thickness to achieve enhanced reflection of ultraviolet wavelengths.

A coated parabolic reflector 30 suitable for this use is available from American Galvano, 312 N. Cota St., Unit I, Corona, Calif. 91720.

The lamp 20 can be powered from a 12 volt power source such as a vehicle cigarette lighter socket by use of a plug connector 24 connected by cables 26, a strain fitting 28 at the entrance to the handle 12. An on-off switch 33 connects one lead to the lamp 20, a connector 32 connecting the other lead. Batteries or an AC power source can also be used.

A selective dicbroic reflector 36 is mounted within the head portion 14 opposite the reflector 30 and lamp 20, inclined at 45° such as to redirect UV light emitted from the lamp 20 and parabolic reflector 30 out through the window 16 in one side of the housing 11. The selective reflector 36 acts as a beam splitter, transmitting visible and infrared light while reflecting UV light such as to direct a pure UV beam out through the lens window 16. The window 16 may be covered with a window lens constructed of borosilicate glass which is believed to block shorter wavelengths of UV light which might be hazardous to the eyes, i.e., around 320 nm and lower.

The cold mirror reflector 36 preferably is of dichroic design utilizing a series of coatings of a predetermined thickness to create selective reflection. This invention contemplates a design of such coatings to produce selective reflection of UV light rather than transmission of UV light as described in U.S. Pat. No. 5,905,268, so that a UV light beam is directed out through the side facing window 16.

At the same time, the coatings are designed so that visible light is transmitted through the reflector 36 rather than reflected, so that a beam of visible light is directed out through the window 38 covered by cap 18. Window 38 is also preferably covered with a clear lens covering constructed of borosilicate glass to block any deep UV light.

As disclosed in U.S. Ser. No. 09/491,413, filed on Jan. 26, 2000, dichroic optical elements from ZC & R Coatings for Optics, Inc. of Torrance, Calif. are preferred as having coatings of tantalum pentoxide which do not absorb UV.

A suitable cold mirror having a part number CM-UV-350 is commercially available from ZC & R.

That particular cold mirror has a high percentage of reflectance and low percentage of transmittance of wavelength in the range of 350 nm to 450 and a high percentage of transmittance of wavelength from 600 nm to 1200 nm and higher. Deep UV, i.e., below 340 nm is largely transmitted.

Thus, both visible and infrared are caused to be transmitted out of the light 10 to minimize heating and to create a visible beam for use in other tests and as a flashlight.

The coatings of the cold mirror reflector 36 can also be applied by ZC & R to minimize blue visible light at wavelengths over 400 nm where the tracer dyes do not fluorescence in response to such blue light in order to eliminate the need for "blue blocker" eyeglasses which are necessary when the UV light beam also contains blue light.

Elimination of blue light in the UV beam is advantageous for some leak testing applications as described in the above referenced copending application.

Figure 3:
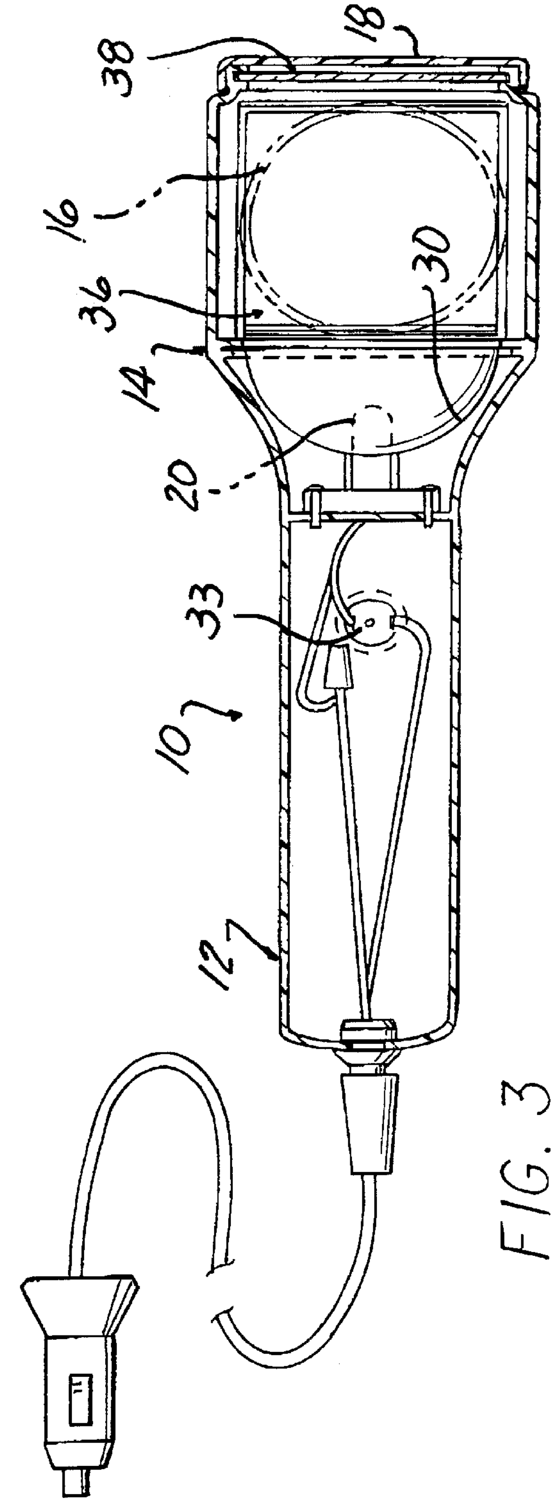
FIG. 3 is a top view of the partial section of FIG. 2.
Figure 4:
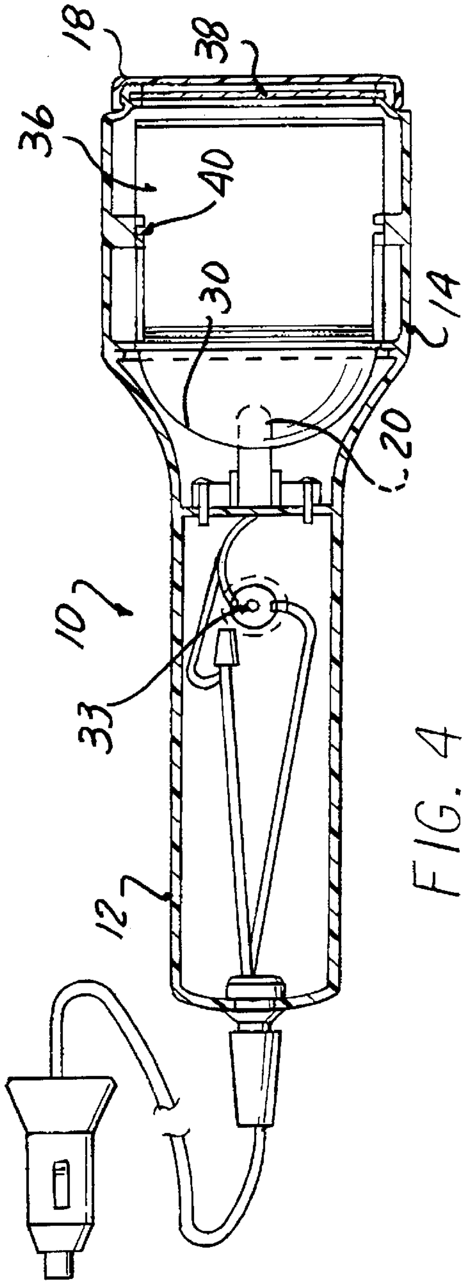
FIG. 4 is a partially sectional view taken through the center of the light showing the reflector mounting.

The cold mirror reflector 36 can comprise a rectangular piece of coated borosilicate glass as seen in FIGS. 3 and 4. A molded-in groove 40 holds the reflector 36 in position in the head 14 at a 45° angle.

The cap 18 also of a molded plastic such as silicone can be opaque to block the visible light, or the cap 18 can be removed to use the light 10 as a flashlight. If the visible light does not interfere with observation of the fluorescence, since being directed at 90° to the UV beam, the cap can be removed, tab 42 assisting in its removal, to maximize cooling of the housing interior.

Figure 5:
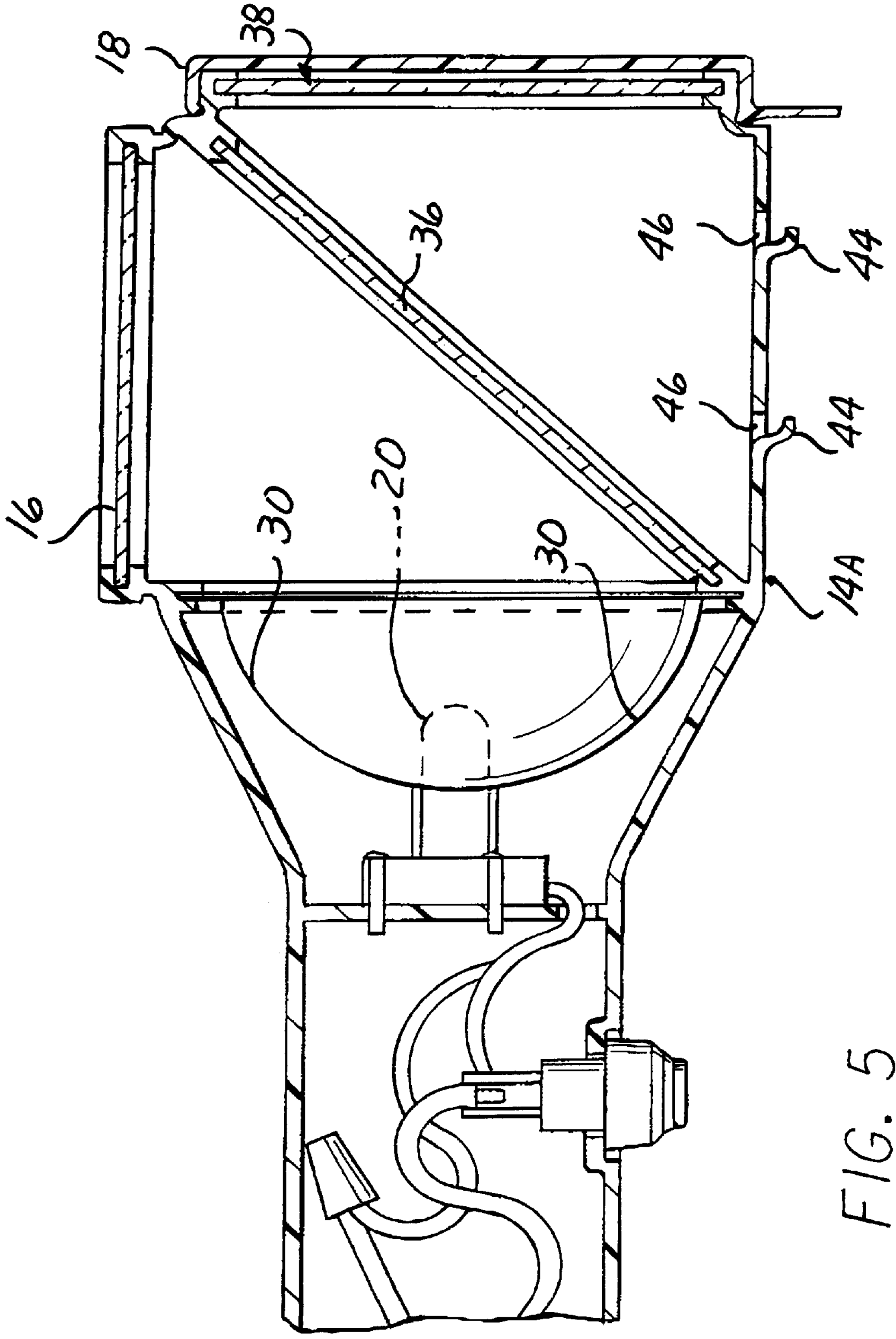
FIG. 5 is an enlarged partially sectional view of the head portion of an alternate embodiment of the invention.

Alternatively, as shown in FIG. 5, the head 14A can be formed with forward facing louvers 44 which shield vent openings 46 to improve cooling with the cap 18 in place.

What is claimed is:

1. A combination flashlight and light for use in inspection of leak sites and the like, comprising:

a housing;

a lamp mounted in said housing emitting intense UV, visible and infrared radiation when said lamp is energized;

a power source for energizing said lamp;

a switch controlling connection of said power source to said lamp to control energization of said lamp;

a dichroic cold mirror reflector mounted to said housing facing said lamp but inclined thereto, said dichroic cold mirror reflector coated so as to reflect UV light from said lamp laterally while transmitting visible and infrared light;

said housing having a first window located to receive said UV beam reflected laterally from said dichroic cold mirror reflector to be allowed to exit out of said housing, and a second window located aligned with said lamp and said dichroic cold mirror reflector to allow said visible and infrared light to exit therethrough and out of said housing.

2. The UV light according to claim 1 further including a detachable cap on said second window.

3. The UV light according to claim 2 further including vent holes in said housing behind said dichroic cold mirror reflector.

4. The UV light according to claim 3 further including louvers facing said second window.

5. The UV light according to claim 1 further including a parabolic reflector having said lamp approximately located at the focal point thereof and concentrating light emitted from said lamp and directing the same at said dichroic cold mirror reflector.

6. The UV light according to claim 1 wherein said first and second windows have a window lens mounted therein constructed of borosilicate glass to block UV below about 320 nm.

7. The UV light according to claim 1 wherein said dichroic cold mirror reflector reflects a high percentage of light in the range of 350 to 450 nm and transmits light in a range longer than 450 nm.

8. The UV light according to claim 1 wherein said dichroic cold mirror reflector reflects a high percentage of in the range of 320 to 380 nm and transmits high percentage of light in a range over 400 nm.

* * * * *